UNITED STATES PATENT OFFICE.

RUDOLF MAAG, OF SINDLINGEN, NEAR HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VAT DYESTUFFS AND PROCESS OF MAKING SAME.

1,015,329.   Specification of Letters Patent.   Patented Jan. 23, 1912.

No Drawing.   Application filed April 17, 1911. Serial No. 621,670.

*To all whom it may concern:*

Be it known that I, RUDOLF MAAG, Ph. D., chemist, a citizen of the Republic of Switzerland, residing at Sindlingen, near Höchst-on-the-Main, Germany, have invented certain new and useful Improvements in New Vat Dyestuffs and Processes of Making Same, of which the following is a specification.

I have found that the benzoquinone-dianilids, which are substituted by halogen in para position to the nitrogen in the anilido groups, and the constitution of which corresponds to the general formula:

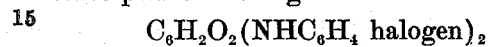

are valuable yellow vat dyestuffs. These new dyestuffs can be produced by causing a halogen to act upon the benzoquinone-dianilid, obtainable for instance from benzoquinones by the action of anilin. They are yellowish-brown to brownish-red powders which are insoluble in alcohol, ether and benzene and soluble in hot glacial acetic acid and nitrobenzene with a brownish-red color; when dissolved in concentrated sulfuric acid they give a violet coloration and when treated with alkaline hydrosulfite they give light-yellowish solutions, from which the dyestuff can be regenerated by passing air into it. The new dyestuffs dye wool fast yellow tints.

In preparing the new dyestuffs I can, for instance, proceed as follows: 12 parts by weight of benzoquinone-dianilid,

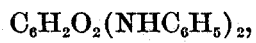

are dissolved, while heating, in 100 parts of nitrobenzene and a solution of 14 parts of bromin in 30 parts of nitrobenzene is gradually added at a temperature of 170–200° C. while stirring. For completing the reaction, the mass is heated for some further time and, after cooling, the separated dyestuff is filtered off. It is soluble in nitrobenzene with a reddish-brown color, insoluble in alcohol, ether and benzene, and forms a brown powder. In concentrated sulfuric acid it dissolves with a violet color. When gently heated with alkaline hydrosulfite, it yields a light yellow solution, which dyes wool light-yellow tints, which, on exposure to the air, become deep-yellow tints remarkable for their fastness.

Having now particularly described my invention, what I claim is:

1. As new products, the benzoquinone-dianilids which are substituted in the anilido groups in para position by halogen, said products being yellowish-brown to reddish-brown powders, insoluble in alcohol, ether and benzene, soluble in nitrobenzene with a brownish-red color, in concentrated sulfuric acid with a violet color, yielding, when gently heated with alkaline hydrosulfite, light-yellowish solutions and dyeing wool fast yellow tints.

2. As a new product, the benzoquinone-di-parabromanilid of the formula:

being a brown powder insoluble in alcohol, ether and benzene, soluble in nitrobenzene with a brownish-red color, in concentrated sulfuric acid with a violet color, yielding, when gently heated with alkaline hydrosulfite, a light-yellowish vat which dyes wool fast yellow tints.

3. The process of manufacturing new yellow vat dyestuffs, consisting in causing a halogen to act upon the benzoquinone-dianilid $C_6H_2O_2(NHC_6H_5)_2$.

4. The process of manufacturing a yellow vat dyestuff, consisting in causing bromin to act upon benzoquinone-dianilid.

In testimony whereof, I affix my signature in presence of two witnesses.

RUDOLF MAAG.

Witnesses:
  JEAN GRUND,
  CARL GRUND.